(12) United States Patent
Shuraim et al.

(10) Patent No.: US 9,052,251 B2
(45) Date of Patent: Jun. 9, 2015

(54) SYSTEM AND METHOD FOR DETERMINING LONGITUDINAL MOMENTS IN ONE-WAY JOIST FLOORS

(75) Inventors: Ahmed B. Shuraim, Riyadh (SA); Abdulaziz Al-Negheimish, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 466 days.

(21) Appl. No.: 13/400,936

(22) Filed: Feb. 21, 2012

(65) Prior Publication Data
US 2012/0215465 A1 Aug. 23, 2012

Related U.S. Application Data

(60) Provisional application No. 61/445,474, filed on Feb. 22, 2011.

(51) Int. Cl.
*G06F 19/00* (2011.01)
*G01M 5/00* (2006.01)
*E04B 5/04* (2006.01)

(52) U.S. Cl.
CPC ... *G01M 5/00* (2013.01); *E04B 5/04* (2013.01)

(58) Field of Classification Search
CPC .. B28B 19/003; B28B 23/00; B28B 23/0025; B28B 7/0026
USPC ............................................ 702/33, 182–185
See application file for complete search history.

(56) References Cited

U.S. PATENT DOCUMENTS 6,012,256 A * 1/2000 Aschheim .................... 52/167.1

* cited by examiner

*Primary Examiner* — Edward Raymond
(74) *Attorney, Agent, or Firm* — Foley & Lardner LLP

(57) ABSTRACT

A system for determining longitudinal moments in a one-way joist floor comprising a supporting girder includes at least one computer configured to determine boundaries of at least one equivalent frame, determine a longitudinal moment within a column-beam portion of the at least one equivalent frame based at least in part on a vertical rigidity of the supporting girder, the column-beam portion having at least one column, and determine a longitudinal moment within a lateral section of the at least one equivalent frame based on the longitudinal moment within the column-beam portion, and based at least in part on the vertical rigidity of the supporting girder, the lateral section being lateral to the column-beam portion.

27 Claims, 18 Drawing Sheets

| Section | Actual section shape | Equivalent shape |
|---|---|---|
| R (section INCF in Fig. 8) | $w_f = 6.1$ m (20 ft)<br>$h = 0.250$ m (0.82 ft) | |
| T1 (section JJ in Fig. 8) | $b_w = 1.7$ m (5.58 ft);<br>$w_f = 6.1$ m (20 ft)<br>$h_w = 0.2$ m (0.66 ft);<br>$h_f = 0.05$ m (0.16 ft) | |
| T2 (section SJ in Fig. 8) | $b_w = 2.3$ m (7.54 ft);<br>$w_f = 6.1$ m (20 ft)<br>$h_w = 0.2$ m (0.66 ft);<br>$h_f = 0.05$ m (0.16 ft) | |

FIG. 24

SYSTEM AND METHOD FOR DETERMINING LONGITUDINAL MOMENTS IN ONE-WAY JOIST FLOORS

CROSS-REFERENCE TO RELATED PATENT APPLICATIONS

This application claims priority from Provisional Application U.S. Application 61/445,474, filed Feb. 22, 2011, incorporated herein by reference in its entirety.

STATEMENT REGARDING SPONSORED RESEARCH

This invention was made with support under Grant No. AR-16-66 awarded by King AbdulAziz City for Science and Technology.

BACKGROUND OF THE INVENTION

1. Field of the Invention

The invention relates to one-way joist floors and, more particularly, to a system and method for determining longitudinal moments in one-way joist floors having relatively flexible supporting girders.

2. Description of Related Art

One-way joist floors, such as those for buildings, include joist floors. One-way joist floors may contain a variety of elements, including supporting girders, joists, solid slab, and columns. One-way joist floors may be made of concrete. The concrete may be one-way reinforced or two-way reinforced. The reinforcing structure within such reinforced concrete may be traditional steel rebar or any other structure suitable for reinforcing concrete.

Supporting girders come in a wide array of designs. For example, supporting girders may be wide-shallow beams or floor drop beams. One-way joist floors using wide-shallow beams differ from one-way joist floors using floor drop beams in that wide-shallow beams are generally of substantial width relative to floor drop beams. In one-way joist floors using wide-shallow beams, the depth of the wide-shallow beams is usually the same as the depth of the interconnected joists. One-way joist floors using wide-shallow beams may have columns that are much narrower than the wide-shallow beams. In such structures, eccentricity may exist due to the offset between the centroid of the narrow column and the centerline of the wide-shallow beam. Some supporting girders are more flexible than others. A wide-shallow beam, for example, is generally more flexible than a floor drop beam.

The use of wide-shallow beams is becoming popular in one-way reinforced concrete joist floors due to their constructional and architectural advantages. These advantages are discussed in the following references, hereby incorporated by reference in their entirety: Shuraim, A. et al., "Towards the Development of more Economical Building Systems for Residential Buildings in Suadi Arabia," Final Report Grant No. AR-16-66, vol. I-III, King Abdulaziz City for Science and Technology, Riyadh (2007); Al-Negheimish, A. et al., "Structural design and construction of residential buildings in Riyadh, Saudi Arabia," Proceeding of World Housing Congress, Paper AU2.2, p. 164, Terengganu, Malaysia (2007); Al-Negheimish, A. et al., "Structural Design Practice for Residential Buildings in Riyadh: An Overview," Proceeding of the Sixth Saudi Engineering Conference, vol. 3, p. 46, King Fand University, Dhahran, Saudi Arabia (2002).

Studies on one-way joist floors using wide-shallow beams are limited. The distribution moments in one-way joist floors using wide-shallow beams is complex and differs from what is usually assumed in design practice. For example, in one-way joist floors with wide-shallow beams, parallel joists that are usually assumed to have identical response under uniformly distributed loading may show significant variations in their end-moments. It is believed that the non-uniformity in the distribution of moments is attributable, at least in part, to the flexibility of wide-shallow beams.

One method for determining the distribution of moments within one-way joist floors is the equivalent frame method. The equivalent frame method reduces a three-dimensional joist floor to equivalent plane frames that are capable of demonstrating the distribution of moments within the joist floor with reasonable accuracy. In this method, a joist floor is represented by a number of adjacent x-y equivalent frames. Each x-y equivalent frame is represented by a y-z equivalent frame in a column-beam portion of the joist floor to provide the longitudinal moments along the span. Finally, the longitudinal moments obtained from the y-z equivalent frame are distributed laterally to determine the longitudinal moments in other sections of the joist floor.

For one-way joist floors having wide-shallow beams or similarly flexible supporting girders, several implementations of the equivalent frame method have been suggested. In one, the equivalent frame method is used without any modification factors. See "Structural Use of Concrete BS 8110: Part 1," British Standards Institution, London (1997), hereby incorporated by reference in its entirety. In another, the equivalent frame is modified to adjust for a column's rotational stiffness and the presence of beam-column joints, but is not modified to adjust for axial stiffness of the column. See "Building Code Requirements for Reinforced Concrete and Commentary," ACI 318-05/ACI 318R-05, American Concrete Institute, Farmington Hills (2005), hereby incorporated by reference in its entirety. Neither method accounts for the vertical rigidity of the supporting girder when determining moments in lateral sections. Thus, these implementations do not adequately account for the flexibility of the supporting girder when determining longitudinal moments in one-way joist floors.

In view of the foregoing, a need exists for a improved system and method that can determine the distribution of moments within a one-way joist floor having a relatively flexible supporting girder, such as a wide-shallow beam.

SUMMARY

According to an embodiment of the present invention, a system for determining longitudinal moments in a one-way joist floor comprising a supporting girder is provided. The system includes at least one computer configured to determine boundaries of at least one equivalent frame, determine a longitudinal moment within a column-beam portion of the at least one equivalent frame based at least in part on a vertical rigidity of the supporting girder, the column-beam portion comprising at least one column, and determine a longitudinal moment within a lateral section of the at least one equivalent frame based on the longitudinal moment within the column-beam portion, and based at least in part on the vertical rigidity of the supporting girder, the lateral section being lateral to the column-beam portion.

According to another embodiment of the present invention, a method for determining longitudinal moments in a one-way joist floor comprising a supporting girder is provided. The method includes the steps of representing a layout of the one-way joist floor as at least one equivalent frame, determining, by at least one computer, a longitudinal moment within a column-beam portion of the at least one equivalent frame based at least in part on a vertical rigidity of the supporting girder, the column-beam portion comprising at least one column, and determining, by at least one computer, a longitudinal moment within a lateral section of the at least one equivalent frame based on the longitudinal moment within the column-beam portion, and based at least in part on the vertical rigidity of the supporting girder, the lateral section being located lateral to the column-beam portion.

According to another embodiment of the presenting invention, a non-transient, computer-readable medium encoded with a computer program is provided. The computer program is configured to represent a layout of a one-way joist floor as at least one equivalent frame, determine a longitudinal moment within a column-beam portion of the at least one equivalent frame based at least in part on a vertical rigidity of a supporting girder, the column-beam portion comprising at least one column, and determine a longitudinal moment within a lateral section of the at least one equivalent frame based on the longitudinal moment within the column-beam portion, and based at least in part on the vertical rigidity of the supporting girder, wherein the lateral section is lateral to the column-beam portion.

BRIEF DESCRIPTION OF THE DRAWINGS

The accompanying drawings, which are incorporated in and constitute a part of this specification, illustrate embodiments of the invention and together with the description serve to explain principles of the invention.

FIG. 24 depicts equivalent sections used in an experiment in which the distribution of moments in a wide shallow beam (WSB) floor was determined using an embodiment of the present invention.

DETAILED DESCRIPTION OF THE PREFERRED EMBODIMENTS

Overview

The present invention relates to a system and method for determining longitudinal moments in one-way joist floors having relatively flexible supporting girders. According to an embodiment of the present invention, a computer can be used to determine the distribution of moments in the one-way joist floor. To overcome one or more of the problems with conventional systems, the present inventors, who are associated with King Saud University, have developed the present invention that takes into account the vertical rigidity of the supporting girder.

Figure 1:
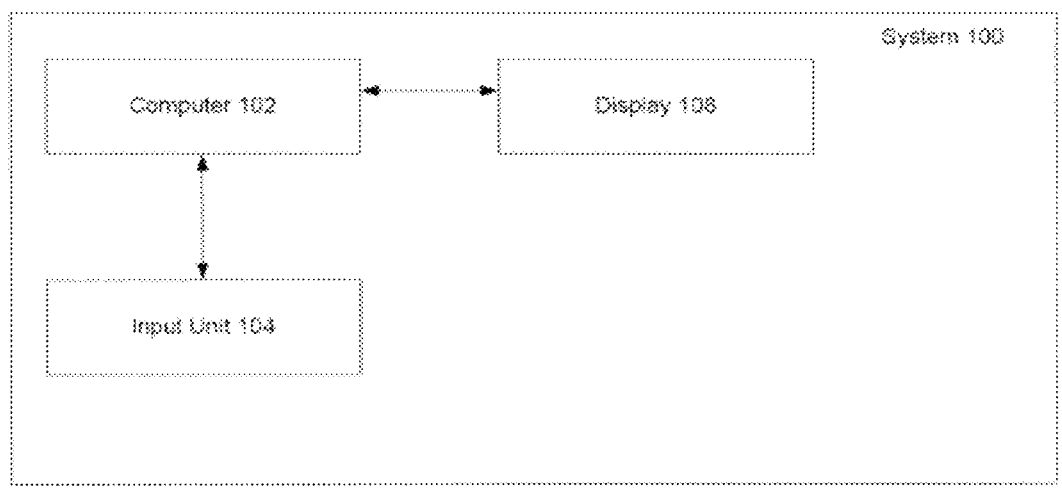
FIG. 1 is a block diagram of a system for determining longitudinal moments in one-way joist floors having supporting girders.

FIG. 1 is a block diagram of an embodiment of a computer-assisted system 100 for determining moments in one-way joist floors having supporting girders. The system includes a computer 102, which is in communication with an input unit 104 and a display 108.

In general, the computer 102 may be configured to determine longitudinal moments in one-way joist floors having supporting girders using an equivalent frame method with modifications to account for the vertical rigidity of the supporting girders. The computer 104 may be configured to, among other things, determine boundaries of an equivalent frame, determine a longitudinal moment within a column-beam portion of the equivalent frame based at least in part on a vertical rigidity of the supporting girder, and determine a longitudinal moment within a lateral section of the equivalent frame based on the longitudinal moment within the column-beam portion, and based at least in part on the vertical rigidity of the supporting girder.

The computer 102 may be any known computing system but is preferably a programmable, processor-based system.

For example, the computer 102 may include a microprocessor, a hard drive, random access memory (RAM), read only memory (ROM), input/output (I/O) circuitry, and any other well-known computer component. The computer 102 is preferably adapted for use with various types of storage devices (persistent and removable), such as, for example, a portable drive, magnetic storage (e.g., a floppy disk), solid state storage (e.g., a flash memory card), optical storage (e.g., a compact disc or CD), and/or network/Internet storage. The computer 102 may comprise one or more computers, including, for example, a personal computer (e.g., an IBM-PC compatible computer) or a workstation (e.g., a SUN or Silicon Graphics workstation) operating under a Windows, MS-DOS, UNIX, or other suitable operating system and preferably includes a graphical user interface (GUI).

The input unit 104 enables information to be communicated to the system 100, including the computer 102. The input unit 104 may be one or more devices used for communication of information, such as the configuration of the one-way joist floor, the materials used in the one-way joist floor, the properties of the materials used in the one-way joist floor, the dimensions of the members in the one-way joist floor, the distribution of force applied to the one-way joist floor, the location of critical sections, and/or any other desired parameter.

The input unit 104 is connected to the computer 102 and may include any device(s) enabling input to a computer. As specific examples, the input unit 104 can include a known input device, such as a keyboard, a mouse, a trackball, a touch screen, a touch pad, voice recognition hardware, dials, switches, buttons, a trackable probe, a foot pedal, a remote control device, a scanner, a camera, a microphone, and/or a joystick.

The display 108 is a visual interface between the system 100 and the user. The display 108 enables information to be communicated from the system 100, including the computer 102, to the user. The display 108 may be one or more devices used for communication of information, such as features of the one-way joist floor, values of moments or forces calculated by the computer, and/or graphical representations of moment distributions.

The display 108 is connected to the computer 102 and may be any device suitable for displaying text, images, graphics, and/or other visual output. For example, the display 108 may include a standard display screen (e.g., LCD, CRT, LED, plasma, etc.), a touch screen, a wearable display (e.g., eyewear such as glasses or goggles), a projection display, a head-mounted display, a holographic display, and/or any other visual output device. The display 108 may be disposed on or near the computer 102 (e.g., mounted within a cabinet also comprising the computer 102) or may be remote from the computer 102 (e.g., mounted in some other location suitable for viewing by the user).

Figure 2:
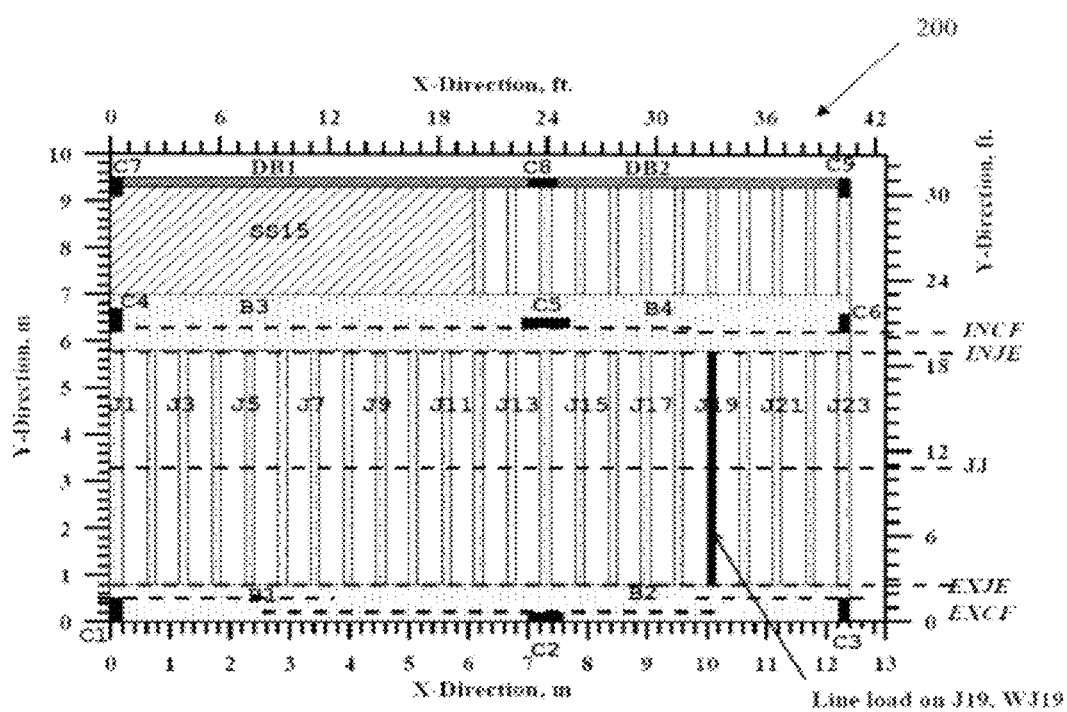
FIG. 2 is a top view of a one-way joist floor, showing member designations and critical sections.
Figure 23:
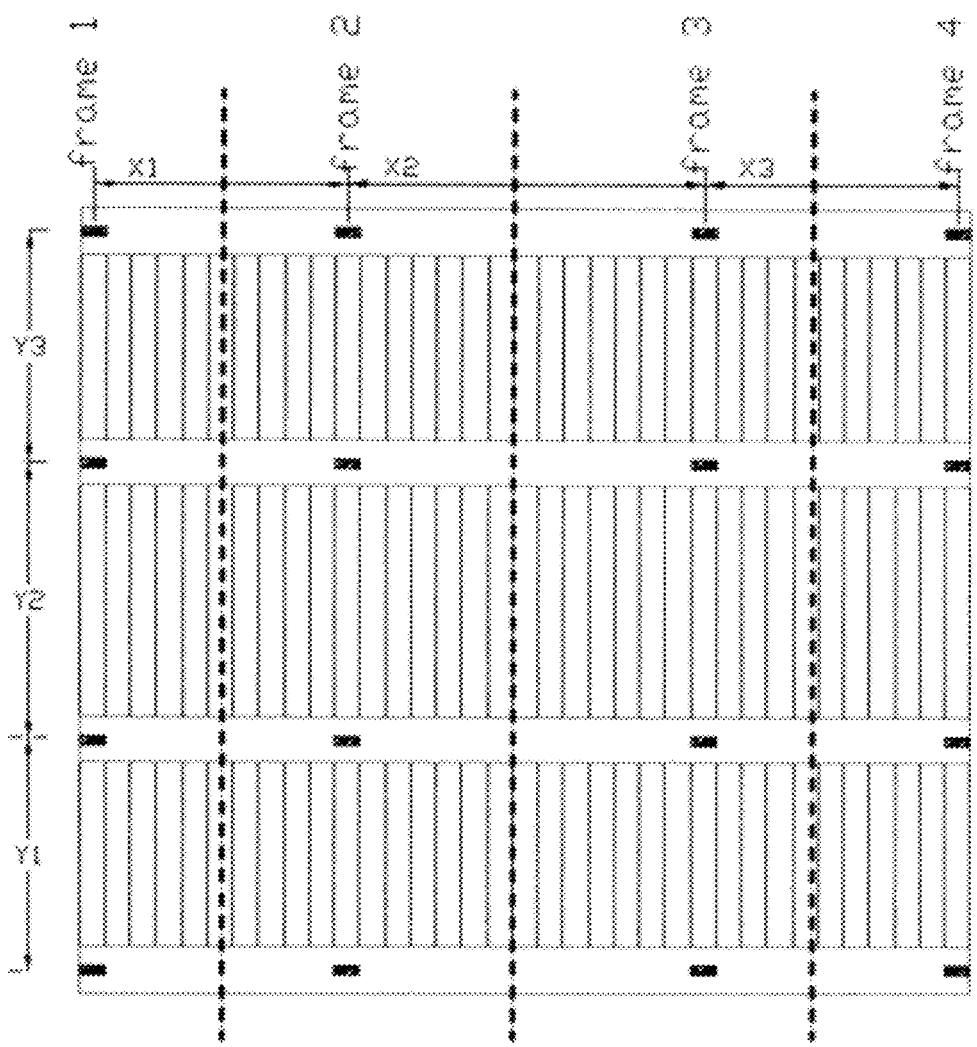
FIG. 23 is a top view of a one-way joist floor having four x-y equivalent frames.

FIG. 2 depicts a one-way joist floor 200, in this case a concrete joist floor, that can be analyzed using embodiments of the present invention. The one-way joist floor 200 may include a variety of members including columns C1-C9, joists J1-J23, solid slab SS15, and supporting girders B1-B4, DB1, DB2. The one-way joist floor 200 may include exterior columns C1, C3, C4, C6, C7, C9, which are columns located at the ends of supporting girders. The one-way joist floor can also include interior columns C2, C5, C8, which are columns located in a section of a supporting girder other than at the ends of the supporting girders. The columns C1-C9 may be narrow columns that are within the typical widths of masonry walls. The supporting girders may include both wide-shallow beams B1-B4, and floor drop beams DB1, DB2, as shown in FIG. 1. Other members may be included in the one-way joist floor 200, including additional types of supporting girders. Embodiments of the present invention may be used to calculate moments in any general one-way joist floor such as that shown in FIG. 23, where the one-way joist floor is represented by four equivalent frames.

In FIG. 2, a number of critical sections are shown. Critical section INCF is located adjacent to the columns C4-C6. Critical section INJE is located adjacent to the wide-shallow beams B3, B4. Critical section J-J is located at the midpoint of the joists J1-J23. Critical section EXJE is located adjacent to the wide-shallow beams B1, B2. Critical section EXCF is located adjacent to the columns C1-C3. Critical sections other than those shown in FIG. 2 are possible. The location of the critical sections will vary based on the layout of the one-way joist floor 200.

The system 100 can be used to determine the distribution of longitudinal moments in a one-way joist floor 200, such as the one depicted in FIG. 2. Preferably, the system 100 determines the distribution of longitudinal moments using the equivalent frame method. The use of the equivalent frame method is generally discussed in "Structural Use of Concrete BS 8110: Part 1," British Standards Institution, London (1997) and "Building Code Requirements for Reinforced Concrete and Commentary," ACI 318-05/ACI 318R-05, American Concrete Institute, Farmington Hills (2005), both of which are hereby incorporated by reference in their entirety. The purpose of the equivalent frame method is to reduce a three-dimensional one-way joist floor 200 to equivalent frames that allow a distribution of moments within the one-way joist floor 200 to be determined with reasonable accuracy. In embodiments of the invention, modifications to the equivalent frame method are made to account for the vertical flexibility of the supporting girder. This vertical flexibility is encountered when the supporting girder is relatively flexible in a vertical direction, for example, when the supporting girder is a wide-shallow beam. One goal of embodiments of the present invention is to provide the distribution of moments in a one-way joist floor 200 containing relatively flexible supporting girders with reasonable accuracy in order to satisfy strength and serviceability criteria.

The Role of Vertical Rigidity on Moment Non-Uniformity

Figure 3:
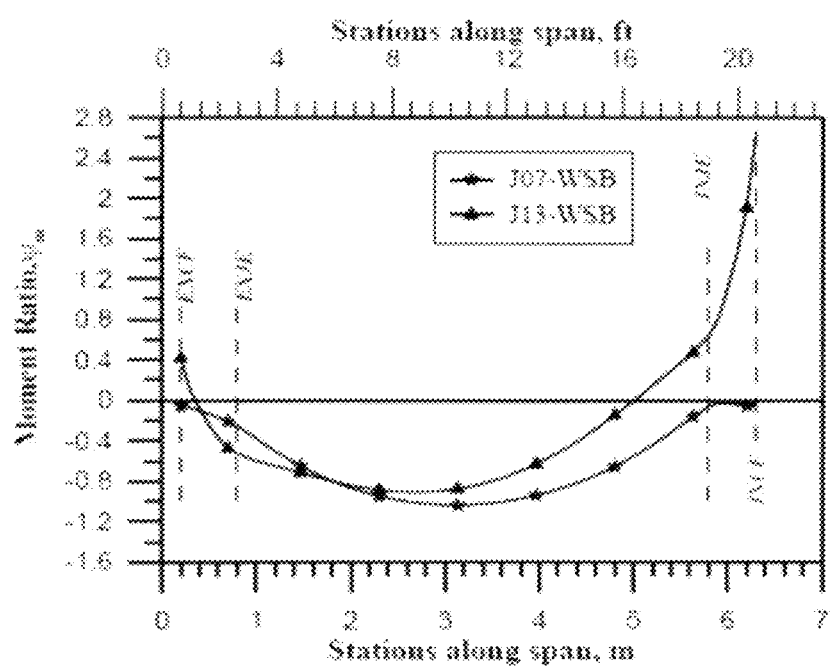
FIG. 3 is a graph showing the moment ratios of two individual joists in the one-way joist floor shown in FIG. 2.
Figure 4:
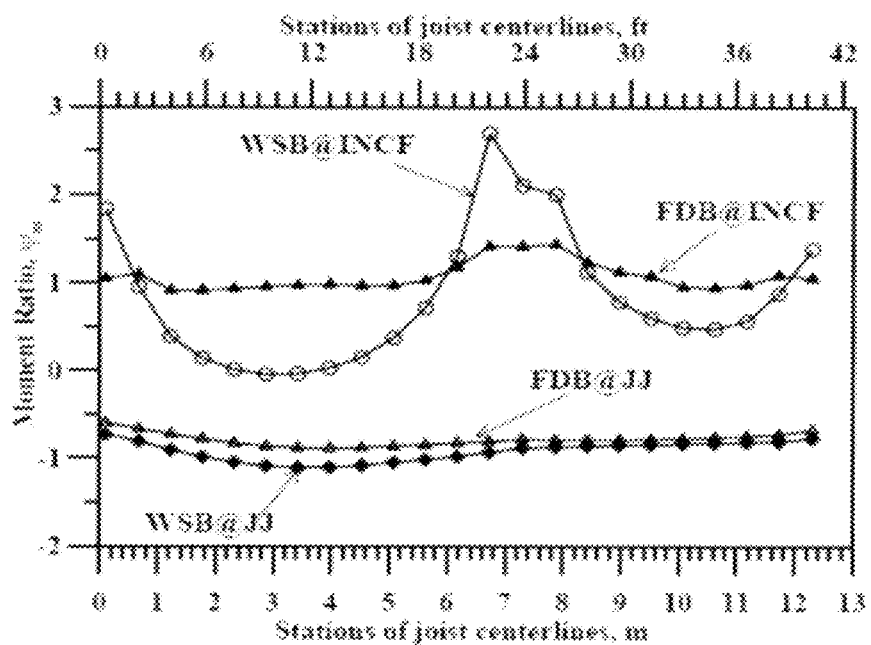
FIG. 4 is a graph showing the moment ratios of both a one-way joist floor having wide-shallow beams and a one-way joist floor having floor drop beams at two critical sections.

FIG. 3 is a graph showing the moment ratios of two individual joists in the one-way joist floor shown in FIG. 2. FIG. 3 shows that interior negative moments in joists J7 and J13 at section INCF vary significantly from each other. The overall trend is illustrated in FIG. 4 for the entire floor. The underlying cause of these variations is the vertical rigidity of the supporting girder, as will be illustrated by the following spring and grid analogies.

Figure 5:
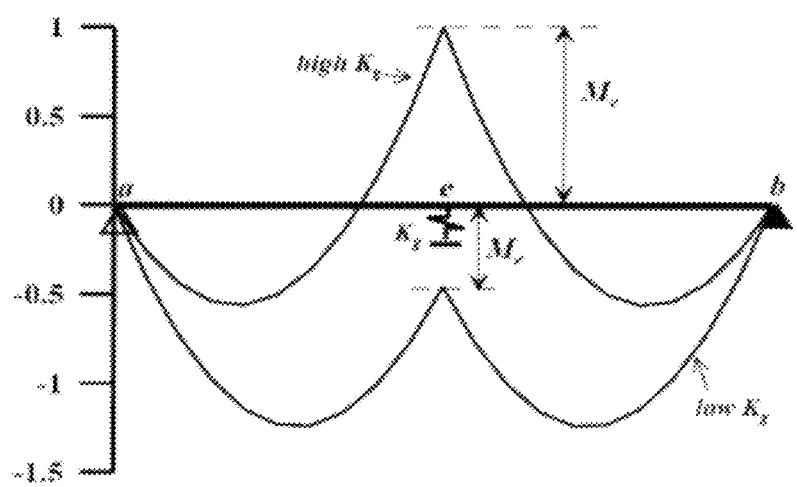
FIG. 5 is a moment diagram for a continuous beam on an elastic spring.

FIG. 5 is a moment diagram for a continuous beam on an elastic spring. From the fundamentals of elastic structural analysis of a two-span beam supported on a spring, the interior negative moment $M_e$ can have a large spectrum of possible values depending on the spring constant of the elastic spring, which is representative of the vertical rigidity $K_g$ of the supporting girder, as demonstrated in FIG. 5. The negative moment not only decreases gradually in magnitude as the vertical rigidity $K_g$ decreases, but also changes its sign and becomes positive.

Figure 6:
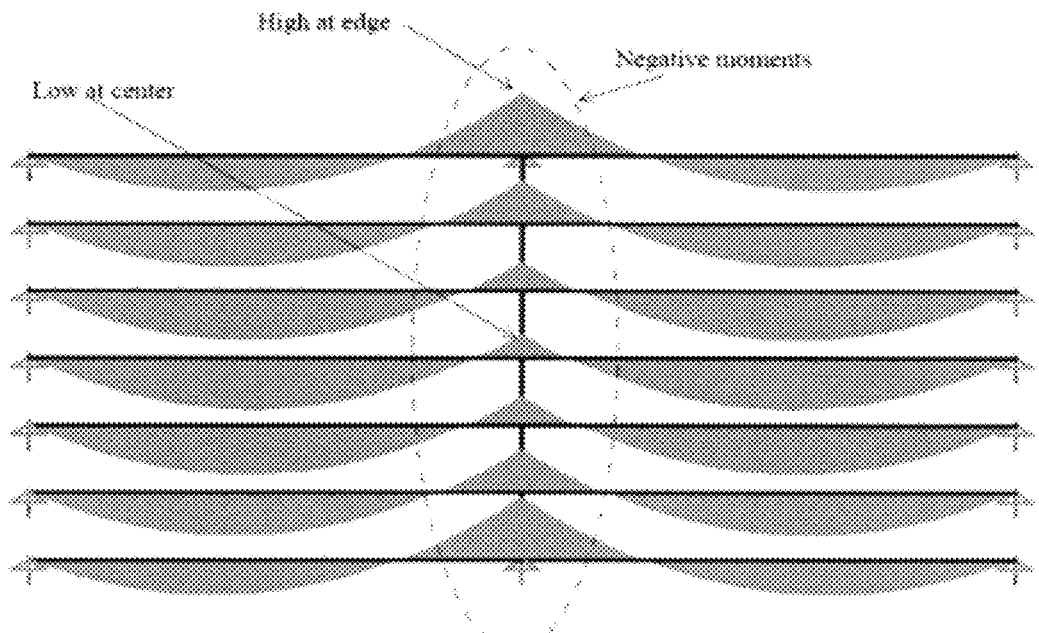
FIG. 6 is a moment diagram for a beam-girder grid system.

FIG. 6 is a moment diagram for a beam-girder grid system. The grid is composed of several secondary beams supported on a simply supported girder at equal intervals. The girder and the secondary beams have the same depth, but the girder is wider, and they have the same material elastic properties. The results show that the beams' negative moments vary with the location of the beam-girder intersection point in a nonlinear form, where the beam supported at the girder's edge has a higher moment than the beam supported at the girder's mid-span.

These two concepts are fundamentally the same when recognizing that the vertical rigidity, $K_g$, of a simply supported girder decreases nonlinearly from the edge to mid-span as shown in the equation:

$$K_g = \frac{3EI}{l^3 \left(1-\frac{x}{l}\right)^2 \left(\frac{x}{l}\right)^2}$$

Figure 7:
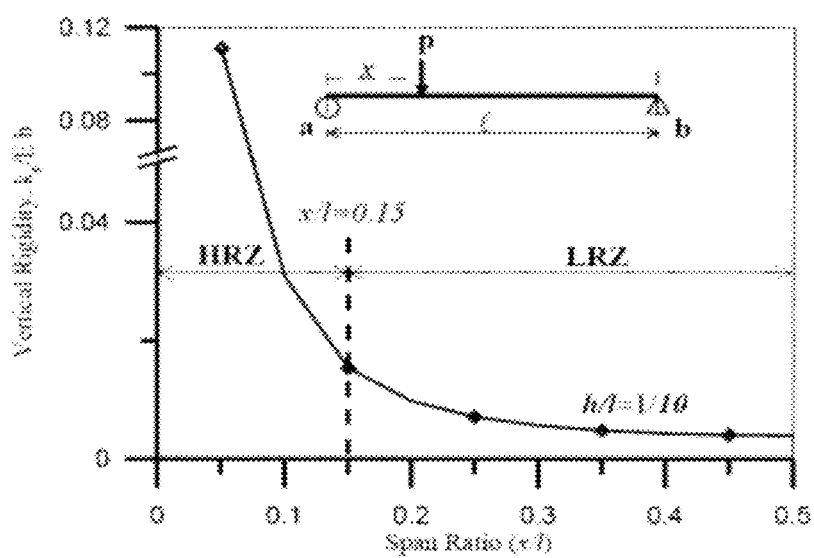
FIG. 7 is a graph showing typical variations in vertical rigidity along the span of a supporting girder.

This nonlinear relationship is demonstrated in FIG. 7, which is a graph showing typical variations in vertical rigidity along the span of a relatively flexible supporting girder.

Therefore, the general trend in end-moment variations is logical and should be expected as illustrated above, in any one-way joist floor having a relatively flexible supporting girder, even though the parameters controlling the relationship will be affected by the layout of the one-way joist floor. Accordingly, the vertical rigidity should play a major role in any successful system for determining longitudinal moments in one-way joist floors having relatively flexible supporting girders.

Determining the Boundaries of Rigidity Zones

Figure 8:
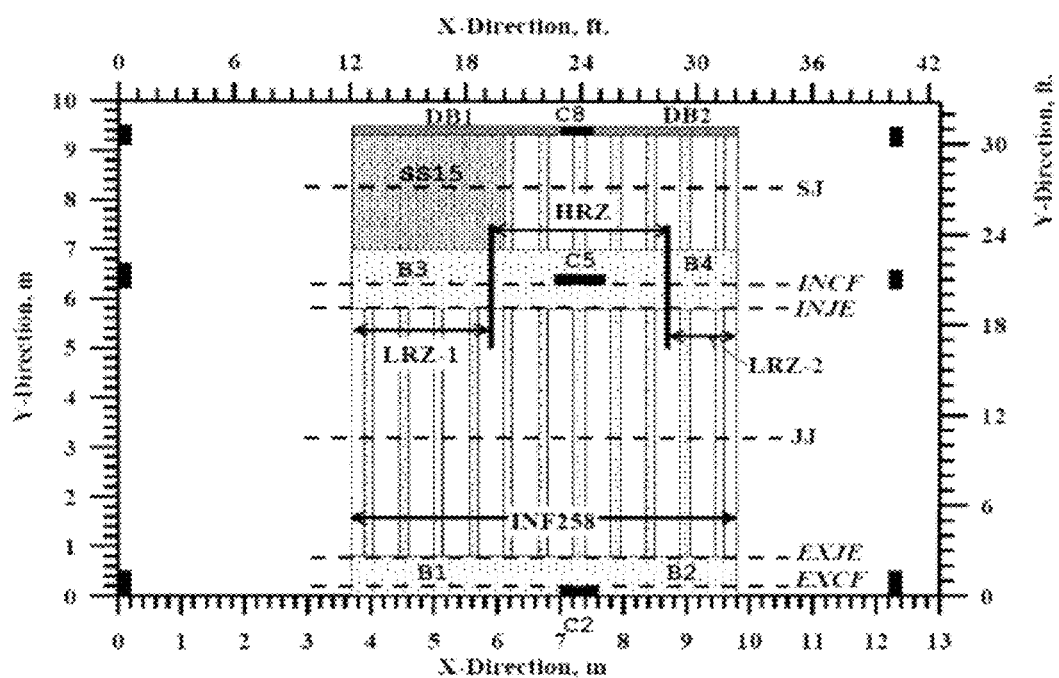
FIG. 8 depicts an interior x-y equivalent frame for the one-way joist floor shown in FIG. 2.
Figure 9:
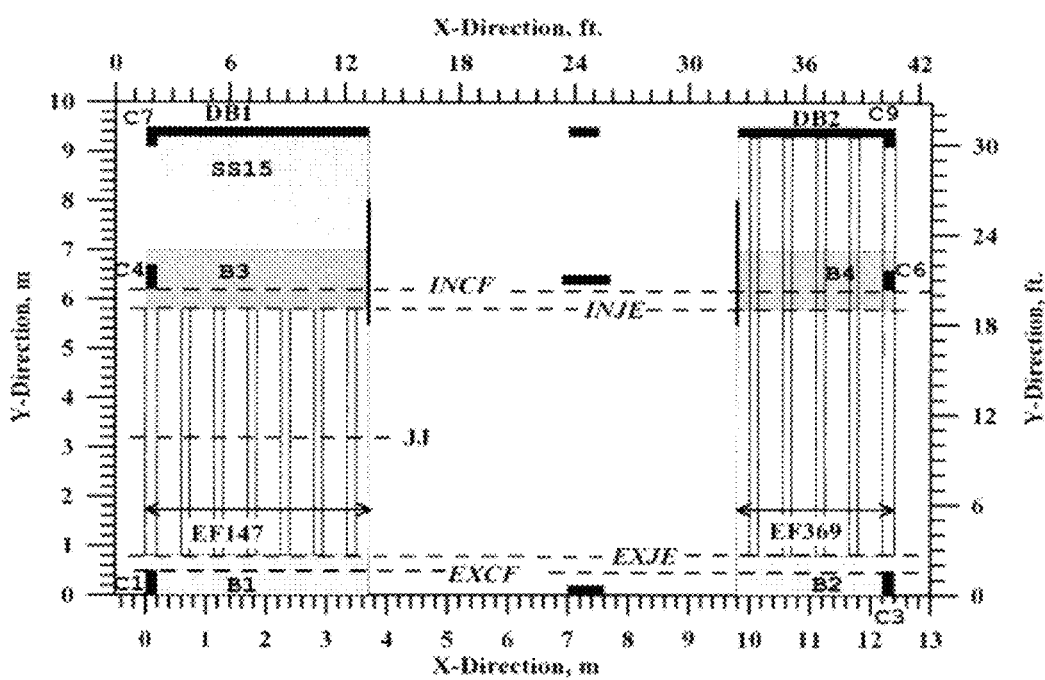
FIG. 9 depicts exterior x-y equivalent frames of the one-way joist floor shown in FIG. 2.

In one embodiment of the invention, the system 100 comprises a computer 102 configured to determine boundaries of at least one x-y equivalent frame INF258, EF147, EF369 such as the ones shown in FIGS. 8 and 9. This equivalent frame is termed the x-y equivalent frame INF258, EF147, EF369 because it is in the x-y plane as shown in FIG. 8. In general, an x-y equivalent frame INF258, EF147, EF369 may be an equivalent frame in the plane that is normal to the direction of the force(s) that causes the moments to be determined by the system 100. For example, in FIG. 2, a force may be applied in the z-direction (into the page). This force causes moments in the members of the one-way joist floor 200. Thus, for the one-way joist floor 200 shown in FIG. 2, the x-y equivalent frames INF258, EF147, EF369 are located in the x-y plane, as shown in FIGS. 8 and 9.

A one-way joist floor 200 can be represented by a number of adjacent x-y equivalent frames INF258, EF147, EF369, as shown in FIGS. 8 and 9. An x-y equivalent frame INF258, EF147, EF369 can be an interior x-y equivalent frames INF258, which is an x-y equivalent frame that includes interior columns C2, C5, C8, or an exterior x-y equivalent frame EF147, EF369, which is an x-y equivalent frame that includes exterior columns C1, C4, C7, C3, C6, C9. FIG. 8 depicts an example of an interior x-y equivalent frame INF258. FIG. 9 depicts examples of exterior x-y equivalent frames EF147 and EF369.

The x-direction boundaries of an internal x-y equivalent frame INF258, such as the one shown in FIG. 8, are the centerlines of two adjacent panels, each adjacent panel being itself bound by four columns. For example, referring to FIG. 2, a first panel is bound by the columns C2, C3, C8 and C9 and a second panel is bound by the columns C1, C2, C7, and C8. The width $w_f$ of an interior x-y equivalent frame INF258 is the distance between the x-direction boundaries of the interior x-y equivalent frame INF258.

The x-direction boundaries of an exterior x-y equivalent frame EF147, EF369, such as the ones shown in FIG. 9, are, on one side, the centerline of the adjacent panel (for example, in FIG. 2, the panel bound by columns C1, C2, C7, and C8), and on the other side, the line representing an end of the one-way joist floor 200 being analyzed (for example, in FIG. 2, the line between columns C1 and C7). The width $w_f$ of an exterior x-y equivalent frame EF147, EF369 is the distance between the x-direction boundaries of the exterior x-y equivalent frame EF147, EF369.

Figure 10:
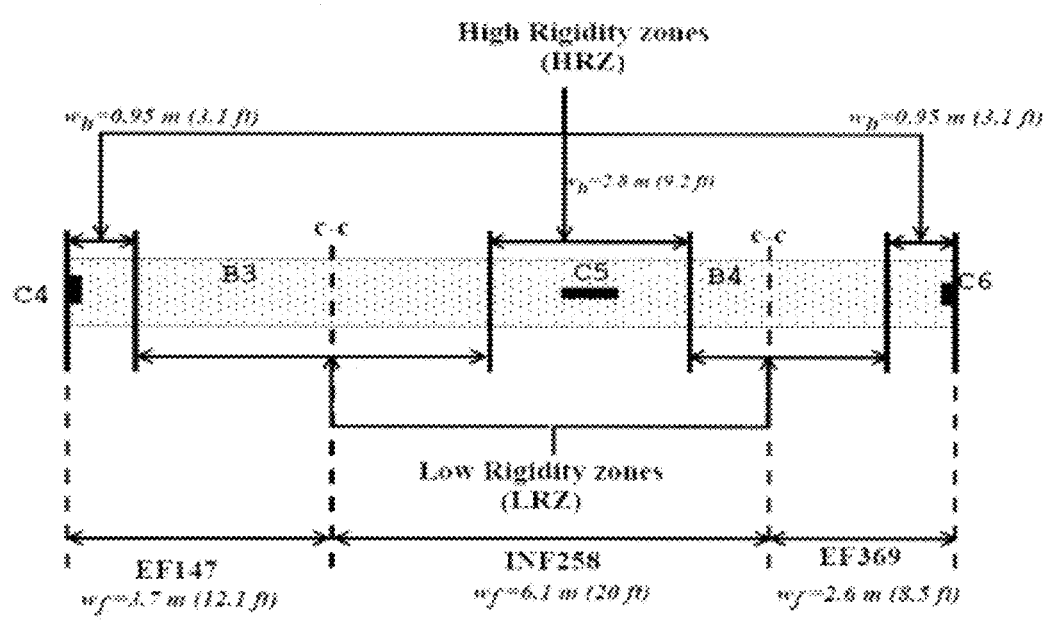
FIG. 10 is a diagram showing the rigidity zones in a supporting girder.

In an embodiment of the invention, the system 100 comprises a computer 102 configured to determine the boundaries of at least one high-rigidity zone HRZ and at least one low-rigidity zone LRZ within the at least one x-y equivalent frame INF258, EF147, EF369. For example, in FIG. 8, the x-y equivalent frame INF258 is divided into one high-rigidity zone HRZ and two low-rigidity zones LRZ-1 and LRZ-2. The width of the high-rigidity zone HRZ can be determined based on whether the high-rigidity zone HRZ is located within an interior x-y equivalent frame INF258 or an exterior x-y equivalent frame EF147, EF369. The width of the high-rigidity zone can be represented as a percentage of the width of the x-y equivalent frame in which the high-rigidity zone is located. The ratio of the width of the high rigidity zone to the width of the x-y equivalent frame in which the high-rigidity zone is located is the factor $\alpha_1$. For an interior x-y equivalent frame, the factor $\alpha_1$ may be about 0.45. For an exterior x-y equivalent frame, the factor $\alpha_1$ may be about 0.3. Because a one-way joist floor may be composed of a number of parallel elements such as joists, the width of the high-rigidity zone may be adjusted to ensure that an integer number of elements is included in each rigidity zone, as shown, for example, in FIG. 10.

Determining a Longitudinal Distribution of Moments in Column-Beam Portions

Figure 11:
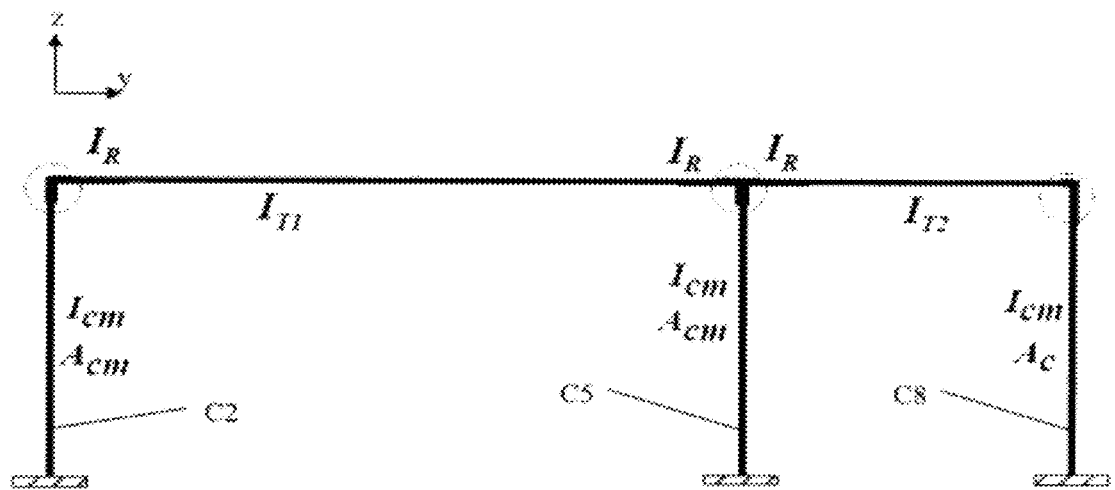
FIG. 11 depicts a y-z equivalent frame of the x-y equivalent frame shown in FIG. 8.
Figure 12:
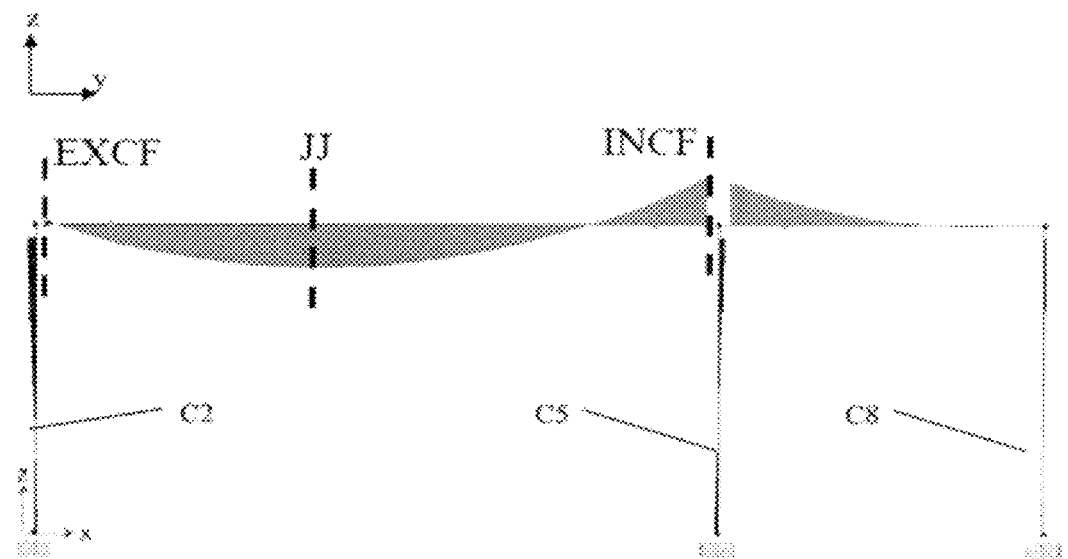
FIG. 12 is a longitudinal moment diagram for the y-z equivalent frame shown in FIG. 11.

In one embodiment of the invention, the system 100 comprises a computer 102 configured to determine a longitudinal moment within a column-beam portion of the at least one x-y equivalent frame INF258 based at least in part on the vertical rigidity of the supporting girder. The term "column-beam portion" refers to a portion of the one-way joist floor that includes one or more columns. For example, one such column-beam portion would be the portion between columns C2, C5 and C8 in FIG. 2. The longitudinal moment within such column-beam portions can be determined by first representing the one-way joist floor at a column-beam portion as a two-dimensional y-z equivalent frame. The y-z equivalent frame for the interior x-z equivalent frame INF258 is depicted in FIG. 11. This y-z equivalent frame is located at the column-beam portion between the columns C2 and C8. This equivalent frame is termed the y-z equivalent frame because it is in the y-z plane, as shown in FIG. 11. In general, the y-z equivalent frame may be an equivalent frame in a plane parallel to the direction of the force(s) that cause the moments to be determined by the system 100. The longitudinal moment diagram for this y-z equivalent frame is shown in FIG. 12.

Different procedures have been proposed for the analysis of flat slabs under gravity loading. Several of these procedures are described in the following references: Corley, W. et al., "Equivalent Frame Analysis for Slab Design," 67 ACI Journal 875 (1970); Fraser, D., "The Equivalent Frame Method Simplified for Beam and Slab Construction," 4 Concrete International, 66 (1982); Fraser, D., "Simplified Frame Analysis for Flat Plate Construction," 6 Concrete International 32 (1984); Stephen, G. et al., "Equivalent Frame Analysis Methods for Gravity Loading in Flat Slab Structures," 97 ACI Structural Journal 316 (2000); Vanderbilt, M. et al., "Frame Analysis of Concrete Buildings," 5 Concrete International: Design and Construction 33 (1983); Simmonds, S., "Concept and Background of Elastic Frame Analogies for Two-Way Slab Systems," American Concrete Institute, SP-183-01 (1999); Simmonds, S. et al., "Design Factors for the Equivalent Frame Method," 68 ACI Journal, Proceedings 825 (1971); Sharan, S. et al., "Equivalent Frame Analysis Improvements for Slab Design," 75 ACI Journal, Proceedings 55 (1978); Gamble, W., "Plane-Frame Analysis Applied to Slabs," American Concrete Institute SP-183-07 (1999); Long, A. et al., "Equivalent Frame Method for Slab Column Structures," 59 The Structural Engineer 161 (1981). However, none of these procedures adequately takes into account the flexibility/vertical rigidity of the supporting girder.

In one embodiment of the invention, the system 100 comprises a computer 102 configured to determine a modified area of the columns to account for the vertical rigidity of the supporting girder. The modified area may be based on a ratio of the width of the column to the width of the x-y equivalent frame in which the column is located. The column area $A_c$ may be modified to become $A_{cm}$ to account for the vertical rigidity of the supporting girder. The modified column area $A_{cm}$ may be calculated using the equation:

$$A_{cm} = \chi A_c$$

The factor $\chi$ may be determined using the equation:

$$\chi = \frac{\eta_2}{w_f} \geq 0.1$$

where $\eta_2$ is the width of the column for which the moment of inertia is being modified, measured transverse to the y-z equivalent frame, and $w_f$ is the width of the x-y equivalent frame in which the column is located. This modified column area may be used in any calculations performed to determine a longitudinal distribution of moments in a column-beam portion. For example, in structural analysis, the stiffness matrix for any frame member is written in terms of the cross-sectional area of the member, moment of inertia and length. Other known modifications may be made in addition to the modification of the column area.

Determining a Distribution of Moments in Lateral Sections

In an embodiment of the invention, the system 100 comprises a computer 102 configured to determine a longitudinal moment within a lateral section of the at least one equivalent frame based on the longitudinal moment within the column-beam portion, and based in part on the vertical rigidity of the supporting girder. The lateral section can be any section that is lateral to the column-beam portion.

Moments within lateral sections in high-rigidity zones $M_h^i$ may be determined from the moments at column-beam portions $M_f^i$ at any critical location i using the equation:

$$M_h^i = \zeta_h \frac{w_h}{w_f} M_f^i$$

where $\zeta_h$ is the zone intensity factor and $w_h$ is the width of the high-rigidity zone in which the lateral section is located, generally expressed as $\alpha_1 w_f$. Thus, $\alpha_1$ is the ratio of the width of the high-rigidity zone to the width of the x-y equivalent plane in which the high-rigidity zone is located.

The zone-intensity factor $\zeta_h$ may be determined based on whether the moment within the column-beam portion is positive or negative and based on whether the moment is located at an external column C1, C3, C4, C6, C7, C9 or an internal supporting column C2, C5, C8.

Specifically, when the moment within the column-beam portion is positive, the zone intensity factor $\zeta_h$ may be set to equal 1. This indicates that the positive moment is distributed equally among joists.

When the moment within the column-beam portion is negative and the moment is located at an external column C1, C3, C4, C6, C7, C9, the zone intensity factor 4 may be calculated using the equation:

$$\zeta_h = \frac{w_f}{w_h}$$

This indicates that the entire moment within the column-beam portion is assigned to the high-rigidity zone. Thus, when the moment within the column-beam portion is negative and the moment is located at an external column:

$$M_h^i = M_f^i$$

When the moment within the column-beam portion is negative and the moment is located at an internal column C2, C5, C8, the zone intensity factor $\zeta_h$ may be calculated using the equation:

$$\zeta_h = \alpha_2 \left(\frac{K_g}{K_{ca}}\right)^{\alpha_3} \geq 1$$

$K_{ca}$ is the axial stiffness of the column at which the moment is to be determined. For example, for INCF in the interior x-y equivalent frame INF258, it is column C5; for INCF in the exterior x-y equivalent frame EF147, it is column C4; for EXCF in the interior x-y equivalent frame INF258, it is column C2. The axial stiffness may be calculated using the equation:

$$K_{ca} = \frac{A_c E}{l_c}$$

$K_g$ is the vertical rigidity of the supporting girder, calculated using the equation:

$$K_g = \alpha_4 E b \left(\frac{h}{l}\right)^3$$

where E is the modulus of elasticity of the girder material, b is the width of the supporting girder, h is the depth of the supporting girder, and l is the length of the supporting girder.

The coefficients $\alpha 1$ and $\alpha 2$ may be taken approximately as 0.265 and −0.562, respectively, as obtained from the from three-dimensional nonlinear finite element analysis of FIG. 2. $\alpha 1$ and $\alpha 2$ may vary slightly based on the overall dimension of the floor. The coefficients $\alpha_1$ and $\alpha_2$ may be determined from a best fit of a distribution of moments obtained from three-dimensional nonlinear finite element method (3D-NLFE).

The coefficient $\alpha_4$ may be determined based on flexibility coefficients for elastic girders subjected to concentrated unit load. The vertical rigidity for simply supported girder was given by the equation:

$$K_g = \frac{3EI}{l^3 \left(1 - \frac{x}{l}\right)^2 \left(\frac{x}{l}\right)^2}$$

as a function of $$\frac{x}{l}.$$

For continuous members, end-moments effect was imposed on the above equation through numerical manipulation to ensure continuity. Taking $$\frac{x}{l} = 0.25$$

as representative, the vertical rigidity $K_g$ is given by the equations:

$$K_g = 22.475 bE \left(\frac{h}{l}\right)^3$$

for continuous ends and $$K_g = 7.111 bE \left(\frac{h}{l}\right)^3$$

for discontinuous ends.

Thus, for interior x-y equivalent frames, $\alpha_4$ may be approximately 22.475 and for exterior x-y equivalent frames, $\alpha_4$ may be approximately 7.111.

The coefficients $\alpha_1$, $\alpha_2$ and $\alpha_4$ may be further refined through further parametric studies using known methods.

Moments within lateral sections in low-rigidity zones $M_l^i$ at any location i may be determined from the moments at column-beam portions $M_f^i$ and the moments in the high-rigidity zones $M_h^i$ using the equation:

$$M_l^i = M_f^i - M_h^i$$

Thus, using embodiments of the present invention, longitudinal moments within any lateral section in any x-y equivalent frame may be determined.

Experimental Testing Structure

Figure 13:
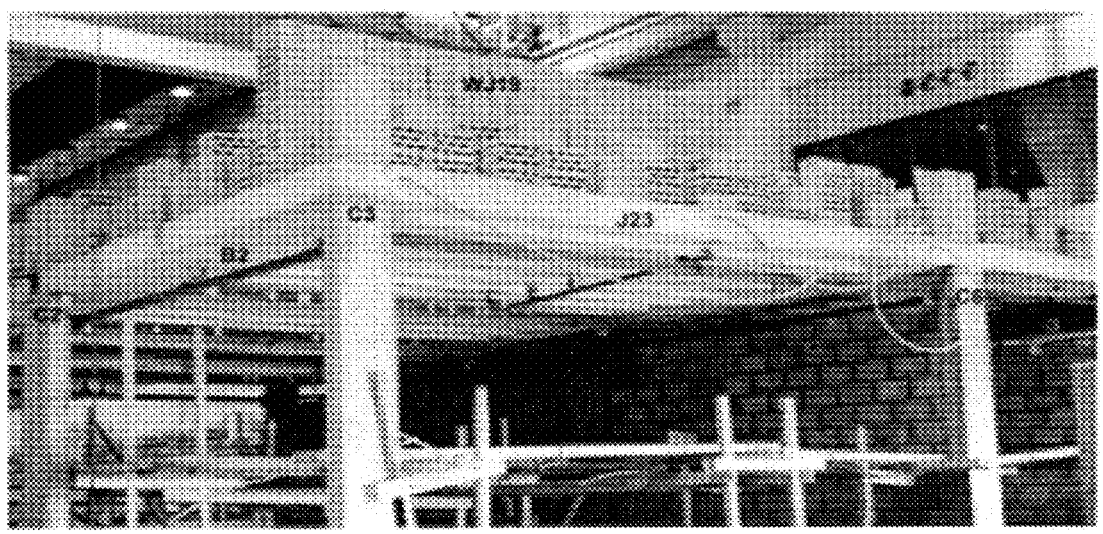
FIG. 13 depicts a tested one-way joist floor showing loading and several of the elements contained in FIG. 2.

Studies on one-way joist floors having wide shallow beams (WSB floors) are limited. Therefore, in order to investigate their behaviors, a full-scale one-way reinforced concrete joist floor with wide-shallow beams supported on slender columns was built and tested under uniformly distributed gravity loading. FIG. 13 shows the completed joist floor having the layout shown in FIG. 2. The floor was studied numerically using three-dimensional nonlinear finite element method (3D-NLFE) to establish the effects of supporting girder flexibility on the behavior. The use of 3D-NLFE to analyze one-way joist floors like the one in FIG. 2 is discussed in Shuraim, A. et al., "Towards the Development of more Economical Building Systems for Residential Buildings in Suadi Arabia," Final Report Grant No. AR-16-66, vol. I-III, King Abdulaziz City for Science and Technology, Riyadh (2007); Shuraim, A., "Three-Dimensional Non-Linear Modeling Aspects of a Full-Scale Reinforced Concrete Banded-Joist Floor," Proceedings of the Eighth International Conference on Computational Structures Technology, Paper 131 (2006); and Shuraim, A. et al., "Influence of Wide-Shallow-Beam Flexibility on Joist-Floor Behavior," Proceedings of the Third International Conference on Modeling, Simulation and Applied Optimization, Paper 89099, Sharjah, U.A.E. (2009), all of which are hereby incorporated by reference in their entirety. The finite element results were validated experimentally, and an additional one-way joist floor having stiff floor drop beams (FDB floor) was analyzed numerically for comparison.

The findings from these studies indicate that the distribution of moments in a one-way joist floor having wide-shallow beams is very complex and differs from what is usually assumed in design practice. For example, parallel joists that are usually assumed to have identical response under uniformly distributed loading showed significant variations in their end-moments. The results indicate that the non-uniformity in the distribution of moments is attributable to the flexibility of wide-shallow beams. The one-way joist floor having floor drop beams showed a more uniform distribution of moments.

Dimensions, main reinforcement, and material properties are given in Table 1.

TABLE 1

| Member | Section dim. b × h mm | Longitudinal rebars No of bars × diameter in mm | | Reinforcement ratio. $\frac{A_s}{A_g} \cdot \%$ | Ties/stirrups | $f_c'$ MPa (ksi) | $f_y$ MPa (ksi) |
|---|---|---|---|---|---|---|---|
| B1, B2 | 250 × 800 | Top | 4 φ 16. | 0.402. | 8@100 mm | 25 | 511 (73) |
| | | | 11 φ 16[1] | 1.06 | (4-Leg) | (3.63) | |
| | | Bot | 7 φ 16 | 0.704 | at B1 ends | | |
| B3, B4 | 250 × 1200 | Top | 5 φ 16. | 0.335. | 8@100 mm | | |
| | | | 17 φ 16[1] | 1.139 | (4-Leg) | | |
| | | Bot | 9 φ 16 | 0.603 | at B3 ends | | |
| DB1, DB2 | 600 × 200 | Top | 2 φ 16 | 0.335 | 8@100 mm | | |
| | | Bot | 2 φ 16 | 0.335 | (2-Leg) | | |
| SS15 | 150 | Top | φ 12@550[2] | 0.14 | None | | 499 (72.4) |
| | | Bot | φ 16@400[3] | 0.34 | | | 511 (74) |
| J2-J22 | 250 × 150 | Top | 1 φ 12 | 0.30 | None | | 499 (72.4) |
| | | Bot | 2 φ 14 | 0.82 | | | 505 (73.3) |
| J1 & J23[4] | 250 × 200 | Top | 1 φ 12 | 0.23 | None | | 499 (72.4) |
| | | Bot | 2 φ 14 | 0.62 | | | 505 (73.3) |
| C1, C4, C8[5] | 200 × 500 | | 8 φ 16 | 1.6 | 8@200 mm (4-Leg) | 28 | 511 (74) |
| C2 | 200 × 600 | | 8 φ 16 | 1.34 | 8@200 mm (4-Leg) | (4.06) | 511 (74) |
| C3, C6, C7, C9 | 200 × 400 | | 8 φ 14 | 1.54 | 8@200 mm (4-Leg) | | 505 (73.3) |

TABLE 1-continued

| Member | Section dim. b × h mm | Longitudinal rebars No of bars × diameter in mm | Reinforcement ratio. $\frac{A_s}{A_g} \cdot \%$ | Ties/stirrups | $f'_c$ MPa (ksi) | $f_y$ MPa (ksi) |
|---|---|---|---|---|---|---|
| C5 | 200 × 800 | 10 ϕ 16 | 1.25 | 8@200 mm (5-Leg) | | 511 (74) |

Notes:
[1] rebars at the interior support;
[2] in the short direction only;
[3] in short and long directions;
[4] in the model, J14 was modeled as J1 and J23;
[5] orientation as shown in FIG. 1;
for dimensions in mm. 25.4 min = 1 in.

The FDB floor used in the analysis was identical to the WSB floor except that it had two stiff drop beams of 300 mm (12 in) width and 700 mm (28 in) depth along column lines C1, C2, C3 and C4, 1 C5, C6, rather than two wide-shallow beams.

The instrumentation plan involved measurement of short-term and long-term strains and deflection. Deflection in beams, joists and columns was monitored using dial gages and linear variable differential transformers. Moreover, surveying technique was also used as supplementary method to monitor the deflection of the slab.

Testing of the roof slab of the prototype building was done in three stages. Stage 1, (SW), was the application of floor self-weight through form-removal. In Stage 2 (WJ19), a line load of 10.0 kN/m (685 lb/ft) was applied on Joist J19, shown in FIG. 2. In Stage 3 (U), a uniform load of 3.5 kN/m2 (70.0 psf) over the entire floor was applied. Concrete blocks were used for load applications.

Figure 15:
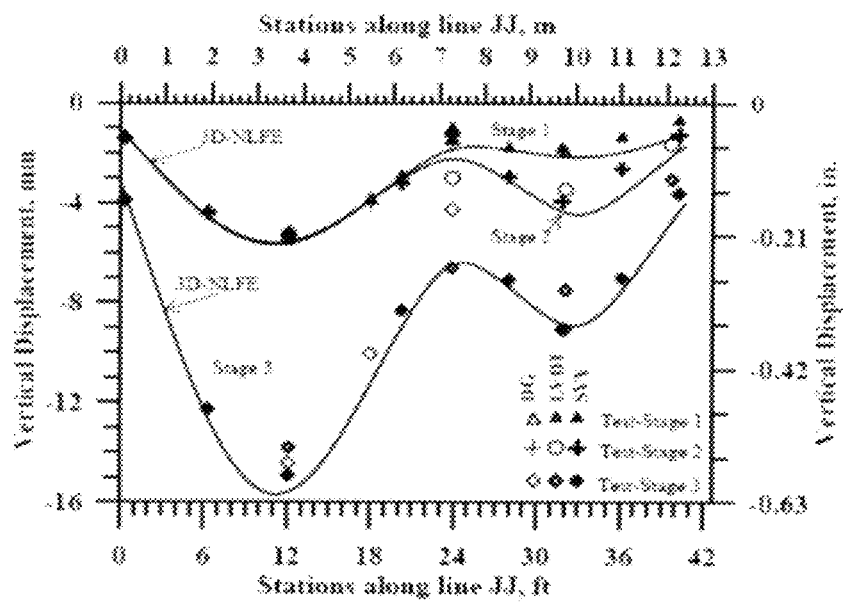
FIG. 15 is a graph showing the deflection profile of the one-way joist floor shown in FIG. 2 during various stages of loading.

Stages 2 and 3 were applied in a set of mini-intervals where deflections, strains and cracking patterns were noted during and after each interval. Net and accumulated deflections and strains due to immediate load effects were assembled for each stage. FIG. 15 is a graph showing the measured deflection profile of the one-way joist floor shown during various stages of loading.

Numerical Model Description

The physical behavior of concrete is very complex, being largely determined by the properties and interaction among its constituent materials. Its behavior is affected by the development of micro and macro cracks at the aggregate-cement paste interface before and after the application of external load. Typical failure types of concrete are cracking in tension and crushing in compression. The failure process is characterized by irreversible deformations and stiffness degradation leading to strain softening under tension and low-confined compression. Compression strain softening is usually accompanied with extensive inelastic volumetric expansion. For a discussion of the physical behavior of concrete, see, for example, ASCE-ACI Committee 447, "Finite Element Analysis of Reinforced Concrete Structures II," ASCE Publications (1993); Chen, W., "Plasticity in Reinforced Concrete," McGraw-Hill Book Co., New York (1982); Grassi, P. et al., "Damage-plastic model for concrete failure," 43 International Journal of Solids and Structures 7166 (2006), the disclosure of each of which is hereby incorporated by reference in its entirety.

To incorporate these experimentally-observed features into finite element method, several constitutive modeling theories have been proposed. The coupled damage-plasticity formulation is popular since it can provide a better representation of salient concrete features. For a discussion of damage-plasticity models, see, for example, Grassi, P. et al., "Damage-plastic model for concrete failure," 43 International Journal of Solids and Structures 7166 (2006); Cicekli, U. et al., "A plasticity and anisotropic damage model for plain concrete," 23 International Journal of Plasticity 1874 (2007); Nguyen, G. et al., "Development of an approach to constitutive modeling of concrete: Isotropic damage coupled with plasticity," 45 International Journal of Solids and Structures 5483 (2008). ABAQUS damage-plasticity model was chosen in this study for modeling concrete behavior, the disclosure of each of which is hereby incorporated by reference in its entirety. For a discussion of the ABAQUS model, see HKS, "ABAQUS—Users Manuals and Theory Manual Version 6.6," Pawtucket, R.I., (2005), which is hereby incorporated by reference in its entirety.

Figure 14:
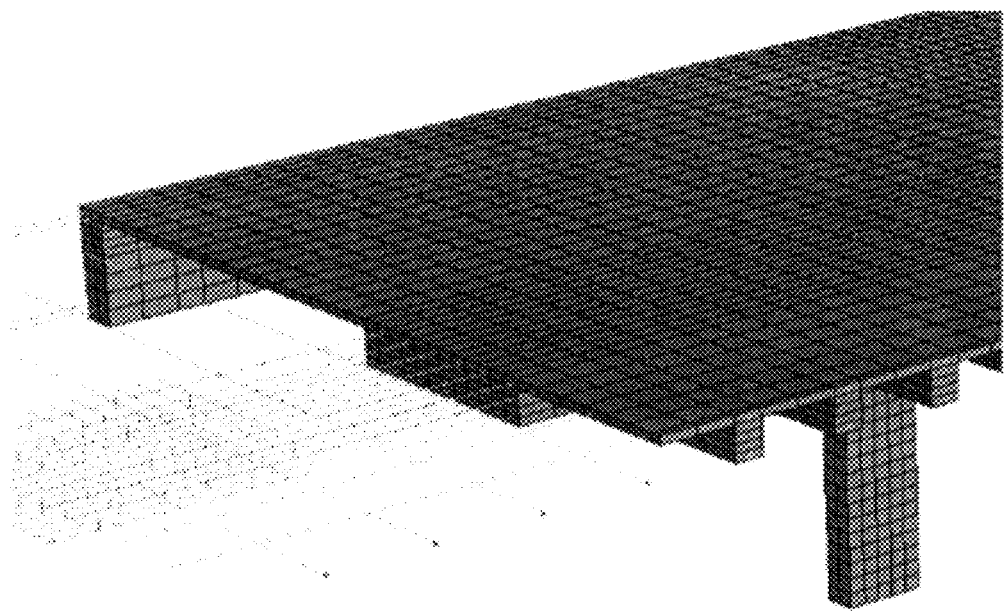
FIG. 14 is a front perspective view of a typical model created using a three-dimensional nonlinear finite element method.

The two floors (WSB and FDB) were represented by three-dimensional nonlinear finite elements where concrete is modeled by 8-node solid elements while the reinforcement is modeled by 2-node truss elements embedded within the concrete solid elements assuming perfect bond between rebars and concrete. The geometry and meshing of a typical model is shown in FIG. 14. The need for three-dimensional modeling arises because of the non-uniformity in floor thickness, existence of columns with eccentricities, different rebar distributions, partial column-floor connections, stirrup arrangements, triaxial effects, and different potential modes of failure.

The input parameters required to define the concrete material include the uniaxial compression curve, the uniaxial tensile strength, poisson's ratio, modulus of elasticity, dilation angle, and the fracture energy. Material parameters were defined based on test data and by making appropriate assumptions when the test data are not available.

The numerical model of the WSB floor was verified through extensive comparisons with test results in terms of deflections, strains and cracking patterns. As an example of the comparison, the vertical deflections along line JJ (see FIG. 2), from experimental and 3D-NLFE are plotted in FIG. 15 for each stage of loading. It can be observed that WSB model produced deflections that are in good agreement with test results for the three loading stages.

WSB-FDB Comparison

For the two floors in this study, the distributions of moments were obtained from the 3-D NLFE, in order to determine the level of non-uniformity in both floors. Examples of the distribution of moments for two joists in WSB floor are shown in FIG. 3. The figure reveals that the end-moments in the two joists in the WSB floor are significantly different. The internal moment profiles at section INCF representing the internal end-moment for the two floors are shown in FIG. 4 in a convenient normalized form.

Figure 16:
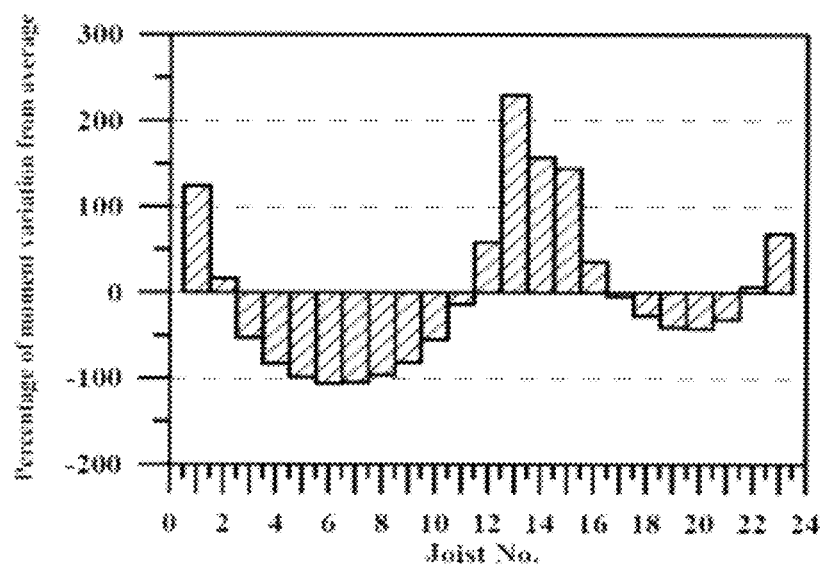
FIG. 16 is a graph showing the percentage of moment variation from the average moment in a one-way joist floor using wide-shallow beams.

It is shown that the moment has high intensity around columns which reaches up to 200 percent higher than the average end-moment, as presented in FIG. 16. On the other hand, middle regions between columns have low moment intensity that can be about 100 percent lower than the average end-moment. These deviations were not found in the FDB floor. It is to be noted that similar deviations from average moments were reported in flat plate floors. See, for example, Jofriet, J., "Flexural Cracking of Concrete Flat Plates, 70 ACI Journal, Proceedings 805 (1973). Studies on two-way slabs have indicated irregular distribution of moments with higher values around the column in what is known as a column strip and lower values in middle strips between columns. See, for example, MacGregor, J. et al., "Reinforced Concrete: Mechanics and Design," 4th Edition, Pearson Prentice Hall, Upper Saddle River, N.J. (2005); Sozen, M. et al., "Investigation of Multi-panel Reinforced Concrete Floor Slabs: Design Methods—their Evolution and Comparison," 60 ACI Journal, Proceedings 999 (1963); Hatcher, D. et al., "Test of a Reinforced Concrete Flat Plate," 91 ASCE Proceedings 205 (1965); Simmonds, S., "Flat Slabs Supported on Columns elongated in Plan,"67 ACI Journal Proceedings 967 (1970); Gamble, W., "Moments in Beam Supported Slabs," 69 ACI Journal Proceedings 149 (1972); Park, R. et al., "Reinforced Concrete Slabs," John Wiley & Sons (1999), the disclosure of each of which is hereby incorporated by reference in its entirety.

Experimental Method

An embodiment of the present invention was used to determine the distribution of moments in the WSB floor to assess its accuracy through comparisons with the results obtained from the three dimensional nonlinear finite element method (3-D NLFE).

The boundaries of three x-y equivalent frames, one interior and two exterior, were determined according to an embodiment of the invention as described above. For the interior x-y equivalent frame, the boundaries of one high-rigidity zone and two low-rigidity zones were determined. For each of the exterior x-y equivalent frames, the boundaries of one high-rigidity zone and one low-rigidity zone were determined.

As discussed above, the accuracy of calculated longitudinal moments at a column-beam portion is affected by the method used to account for the torsional rotation of the slab and the rigidity of the members within beam-column joints. Most analysis software permits inserting modifications for the moment of inertia and cross-sectional area. This study used SAP2000 for the frame analysis which has options for introducing any modifications. For the purposes of this experiment the following methods were used:

First, Each of the slab-beam horizontal members was converted into an equivalent T-section or rectangular section as appropriate. The equivalent sections used in the experiment are shown in FIG. 24.

Second, a modified moment of inertia of the columns was determined to account for the vertical rigidity of the supporting girder. This modified moment of inertia was based on a ratio of an equivalent stiffness of the column to a rotational stiffness of the column. The rotational stiffness of the column was modified to account for the vertical rigidity of the supporting girder.

Each column's moment of inertia $I_c$ was modified to become $I_{cm}$ in order to account for torsional rotations as given by the equation:

$$I_{cm} = I_c \frac{K_{ec}}{K_c}$$

Figure 22:
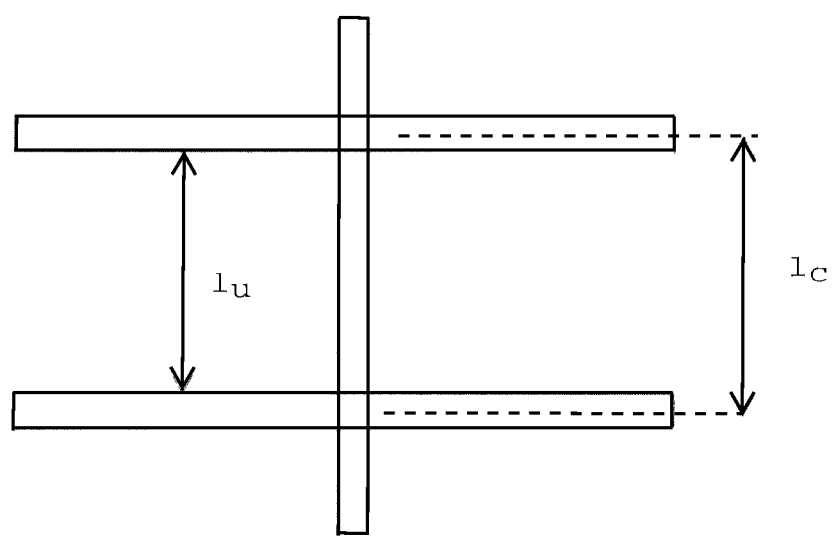
FIG. 22 illustrates the heights $l_c$ and $l_u$ of columns used in calculating a column rotational stiffness.

The column rotational stiffness $K_c$ was modified for the high rigidity at its end using the equation:

$$K_c = \frac{4EI_c}{l_c}\left(\frac{l_c}{l_u}\right)^{2.5}$$

where $l_c$ is the height of the column measured between the centers of two consecutive floors, an upper floor and a lower floor, and $l_u$ is the unsupported height of the column measured from the top face of the lower floor to the bottom face of the upper floor, as shown in FIG. 22. This modified rotational stiffness is suggested in Meyer, C., "Design of Concrete Structure," Prentice-Hall (1996), which is hereby incorporated by reference in its entirety.

The equivalent column stiffness $K_{ec}$ was computed using the equation:

$$\frac{1}{K_{ec}} = \frac{1}{K_t} + \frac{1}{K_c}$$

Figure 17A:
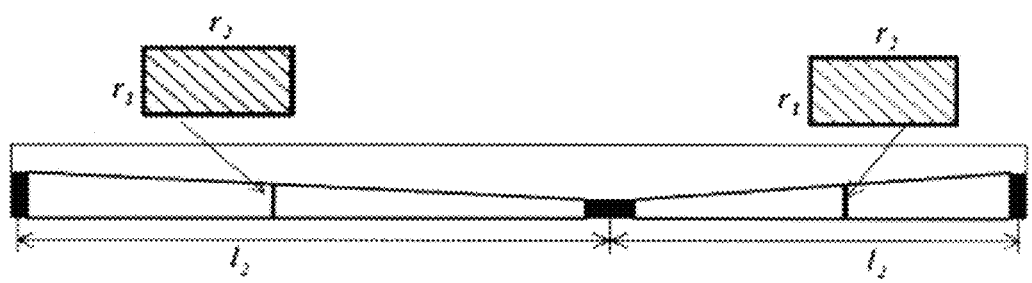
FIG. 17A depicts a member of variable width used in the calculation of torsional stiffness, including, inset, critical sections of the member.

The torsional stiffness $K_t$ was computed using the general equation:

$$K_t = \sum \frac{9EQ}{l_2\left(1 - \frac{\eta_2}{l_2}\right)^3}$$

where $\eta_2$ is the width of the column for which the moment of inertia is being modified, measured transverse to the y-z equivalent frame, and $l_2$ is the length of the span, as illustrated in FIG. 17A.

Figure 17B:
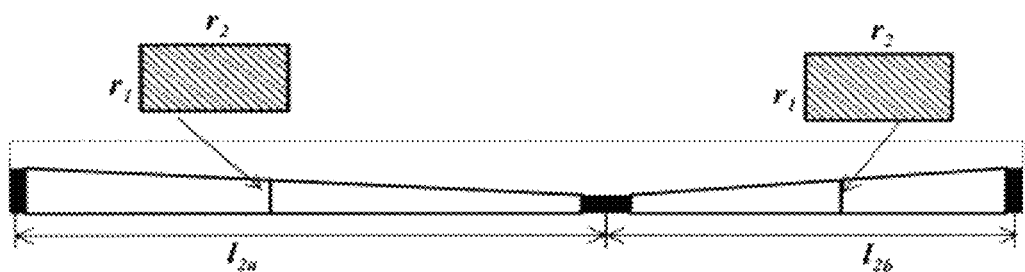
FIG. 17B depicts a member of variable width used in the calculation of torsional stiffness in internal x-y equivalent frames, including, inset, critical sections of the member.

Thus, for internal x-y equivalent frames, $K_t$ was computed using the equation:

$$K_t = \frac{9EQ}{l_{2a}\left(1 - \frac{\eta_2}{l_{2a}}\right)^3} + \frac{9EQ}{l_{2b}\left(1 - \frac{\eta_2}{l_{2b}}\right)^3}$$

where $l_{2a}$ is the span to one side of the x-y equivalent frame and $l_{2b}$ is the span to the other side of the x-y equivalent frame, as shown in FIG. 17B.

For external x-y equivalent frames, there is only one span l2, and the equation may be written simply as:

$$K_t = \frac{9EQ}{l_2\left(1 - \frac{\eta_2}{l_2}\right)^3}$$

This method of determining torsional stiffness is discussed in "Building Code Requirements for Reinforced Concrete and Commentary," ACI 318-05/ACI 318R-05, American Concrete Institute, Farmington Hills (2005), the disclosure of which is hereby incorporated by reference in its entirety.

The constant Q is computed using the equation:

$$Q = \sum \left(1 - 0.63\frac{r_1}{r_2}\right)\left(\frac{r_1^3 r_2}{3}\right)$$

where $r_1$ and $r_2$ are the short and long dimensions, respectively, of the torsional member cross section at the midpoint of $l_2$, $l_{2a}$, or $l_{2b}$ as illustrated in FIGS. 17A and 17B.

Third, the modified column area $A_{cm}$ for the columns C1-C6 was determined according to an embodiment of the invention as described above in the section entitled "Determining a Longitudinal Distribution of Moments in Column-beam Portions."

Fourth, influence of rigid zones within beam-column joints was ignored because complex beam-column joint assumptions have not shown a significant improvement in estimating moments. The influence of rigid zones within beam-column joints could, however be taken into account using known methods.

The embodiment of the present invention used in the experiment is referred to as the rigidity-based equivalent frame system (RB-EQF). For purposes of comparison, the distribution of moments within the experimental joist floor were also determined using the BS-8110 system and the ACI-318 system, neither of which fully accounts for the flexibility of the supporting girder. In the BS-8110 system, the equivalent frame method is used without any modification factors. In the ACI-318 system, the equivalent frame is modified to adjust for a column's rotational stiffness and the presence of beam-column joints, but is not modified to adjust for axial stiffness of the column.

Figure 18:
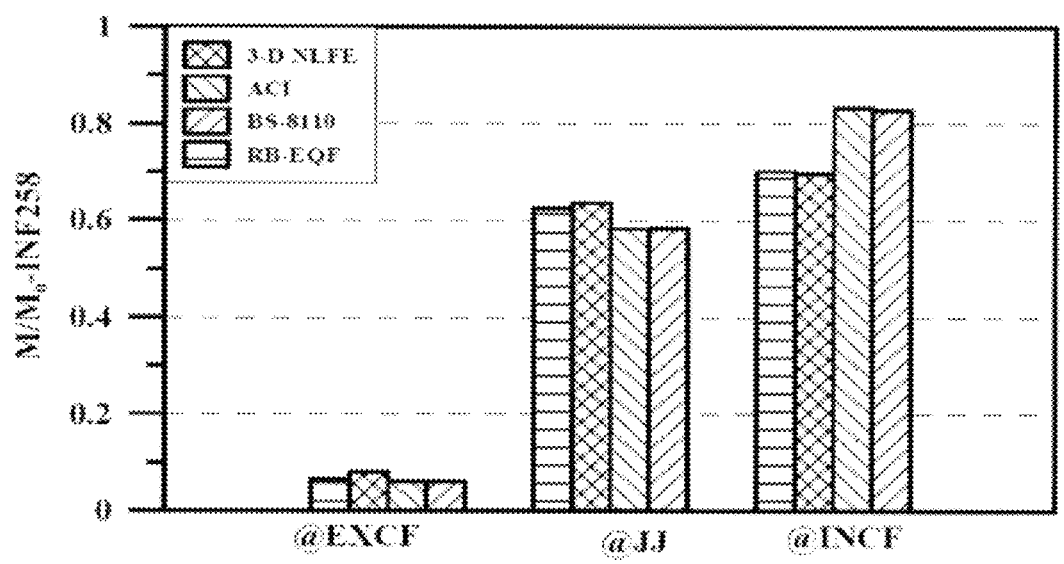
FIG. 18 is a chart showing longitudinal moments calculated using various equivalent frame assumptions along with the longitudinal moment determined using three-dimensional non-linear finite element modeling at various critical sections.

Moments determined by the RB-EQF system, ACI-318 system, and BS-8110 system for column-beam portions of the interior x-y equivalent frame, along with the moments determined using three-dimensional nonlinear finite element method, are presented in a normalized form in FIG. 18. Moments at three sections, EXCF, JJ, and INCF are presented. FIG. 18 demonstrates that the RB-EQF system shows a better capability of estimating the actual moments within the one-way joist floor than the BS-8110 or ACI-318 systems. The BS-8110 or ACI-318 systems lead to similar high estimates of interior negative moments at the section INCF. The comparisons reveal that the interior negative moments and positive moments are very much affected by the axial modification factor introduced by RB-EQF.

The y-z equivalent frames for each column-beam portion were produced, and the longitudinal distribution of moments within each column-beam portion was determined according to an embodiment of the present invention. Zone intensity factors were calculated and the distribution of moments $M_h^i$ and $M_j^i$ within lateral sections of the one-way joist floor was determined according to an embodiment of the present invention as described above in the section entitled "Determining a Distribution of Moments in Lateral Sections."

Figure 19:
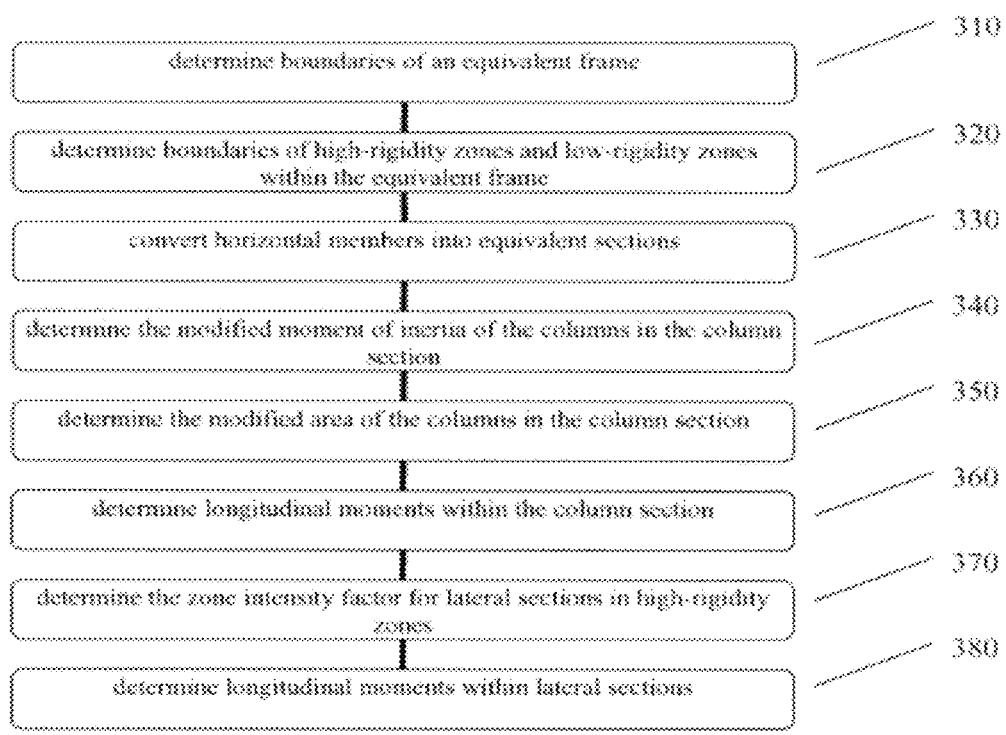
FIG. 19 is a flow chart for a method for determining a longitudinal and lateral distribution of moments in a one-way joist floor according to one embodiment of the present invention.

Thus, in the embodiment of the invention used in the experiment, the process for determining the longitudinal and lateral distribution of moments includes the steps shown in FIG. 19.

Figure 20:
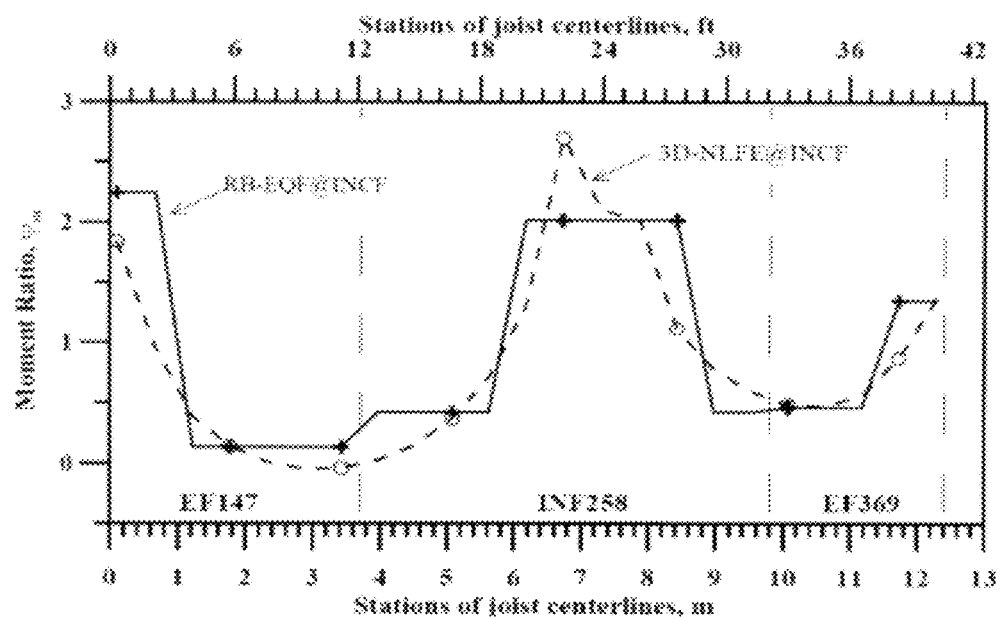
FIG. 20 is a graph showing the moment ratio at the internal supporting girder determined using and the moment ratio at the same girder determined using three-dimensional nonlinear finite element modeling.
Figure 21:
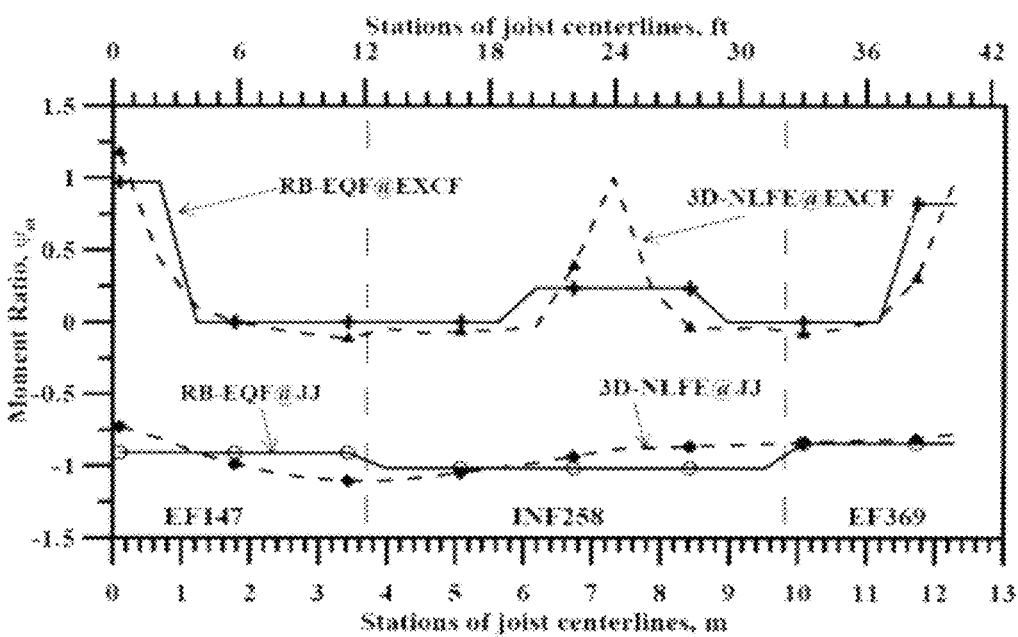
FIG. 21 is a graph showing the moment ratio at the external supporting girder and the section J-J of FIG. 2 determined using an embodiment of the present invention and the moment ratio at the same critical sections determined using three-dimensional non-linear finite element modeling.

The lateral distribution of longitudinal moments in the experimental joist floor was determined at three critical sections: INCF, JJ, EXCF. Negative moment distributions over section INCF from the three x-y equivalent frames are presented in FIG. 20 along with the moment profiles produced by the 3-D NLFE. The computation was performed for each frame separately; however, the results are presented side-by-side for brevity. The figure shows how the zone intensity factor $\zeta_h$ has made the moment distribution determined using RB-EQF more like the actual distribution determined using 3-D NLFE. The positive moment distribution at the section JJ is shown in FIG. 21, where the zone intensity factor $\zeta_h$ produced uniform distribution which is in very good agreement with the distribution from 3-D NLFE. Exterior negative moments at the section EXCF are also shown in FIG. 21, where the zone intensity factor $\zeta_h$ assigned all moment to the high-rigidity zone, which is in good agreement with the distribution determining using 3-D NLFE.

CONCLUSION

The present invention is not limited to the embodiments disclosed above. Those embodiments, however, disclose examples of configurations that can advantageously determine longitudinal moments in one-way joist floors having relatively flexible supporting girders using a computer configured to determine boundaries of at least one equivalent frame, determine a longitudinal moment within a column-beam portion of the at least one equivalent frame based at least in part on a vertical rigidity of the supporting girder, the column-beam portion comprising at least one column, and determine a longitudinal moment within a lateral section of the at least one equivalent frame based on the longitudinal moment within the column-beam portion, and based at least in part on the vertical rigidity of the supporting girder, the lateral section being lateral to the column-beam portion. The present invention can be implemented in a wide variety of configurations beyond those disclosed herein.

For example, the above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

Communication networks can include, for example, the Internet, a carrier internet protocol (IP) network (e.g., local area network (LAN), wide area network (WAN), campus area network (CAN), metropolitan area network (MAN), home area network (RAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft™ Internet Explorer™ available from Microsoft Corporation, Mozilla™ Firefox available from Mozilla Corporation). The mobile computing device includes, for example, a personal digital assistant (PDA).

Other embodiments of the invention will be apparent to those skilled in the art from consideration of the specification and practice of the invention disclosed herein. It is intended that the specification and examples be considered as exemplary only.

What is claimed is:

1. A system for determining longitudinal moments in a one-way joist floor comprising a supporting girder, the system comprising:
at least one computer configured to:
determine boundaries of at least one equivalent frame;
determine a longitudinal moment within a column-beam portion of the at least one equivalent frame based at least in part on a vertical rigidity of the supporting girder, wherein the column-beam portion comprises at least one column;
determine a longitudinal moment within a lateral section of the at least one equivalent frame based on the longitudinal moment within the column-beam portion, and based at least in part on the vertical rigidity of the supporting girder, wherein the lateral section is lateral to the column-beam portion; and
provide an output that includes data representing the determined longitudinal moment within the column beam portion and the determined longitudinal moment within the lateral section.

2. The system of claim 1, wherein:
the one-way joist floor further comprises a plurality of horizontal members, and
the computer is further configured to convert each of the plurality of horizontal members into an equivalent section.

3. The system of claim 2, wherein the equivalent section is at least one of a T-section and a rectangular section.

4. The system of claim 1, wherein the computer is further configured to determine the boundaries of at least one high-rigidity zone and at least one low-rigidity zone within the at least one equivalent frame.

5. The system of claim 4, wherein the computer is further configured to set a width of the at least one high-rigidity zone at about 0.3 to 0.45 times the width of the at least one equivalent frame in which the at least one high-rigidity zone is located.

6. The system of claim 4, wherein:
the computer is further configured to determine whether the lateral section is within the at least one high-rigidity zone, and
when the lateral section is within the at least one high-rigidity zone, the computer is further configured to determine the longitudinal moment within the lateral section based on:
a zone intensity factor, and
a ratio of a width of the at least one high rigidity zone to a width of the at least one equivalent frame.

7. The system of claim 6, wherein the zone intensity factor is based on whether the longitudinal moment within the column-beam portion is positive or negative.

8. The system of claim 7, wherein the zone intensity factor is further based on whether the longitudinal moment within the column-beam portion is at an external column or an internal column.

9. The system of claim 8, wherein, when the longitudinal moment within the column-beam portion is a negative moment and the longitudinal moment within the column-beam portion is at an external column, the computer is further configured to determine that the longitudinal moment within the lateral section is equal to the longitudinal moment within the column-beam portion.

10. The system of claim 8, wherein, when the longitudinal moment within the column-beam portion is a negative moment and the longitudinal moment within the column-beam portion is at an internal column, the computer is further configured to determine the zone intensity factor based on a ratio of the vertical rigidity of the at least one supporting girder to an axial stiffness of the at least one column.

11. The system of claim 7, wherein, when the longitudinal moment within the column-beam portion is a positive moment, the computer is further configured to set the zone intensity factor to 1.

12. The system of claim 6, wherein:
the computer is further configured to determine whether the lateral section is within the at least one low-rigidity zone, and
when the lateral section is within the low-rigidity zone, the computer is further configured to determine the longitudinal moment within the lateral section based on a difference between the longitudinal moment within the column-beam portion and a longitudinal moment within a high-rigidity zone.

13. The system of claim 1, wherein the computer is further configured to determine a modified moment of inertia of the at least one column to account for the vertical rigidity of the supporting girder.

14. The system of claim 13, wherein:
the modified moment of inertia is based on a ratio of an equivalent stiffness of the at least one column to a rotational stiffness of the at least one column, and
the computer is further configured to modify the rotational stiffness of the at least one column to account for the vertical rigidity of the supporting girder.

15. The system of claim 1, wherein the computer is further configured to determine a modified area of the at least one column to account for the vertical rigidity of the supporting girder.

16. The system of claim 15, wherein the modified area is based on a ratio of a width of the at least one column to a width of the at least one equivalent frame.

17. The system of claim 1, wherein the boundaries of the at least one equivalent frame are center lines of two adjacent panels.

18. The system of claim 1, wherein the at least one equivalent frame comprises a plurality of adjacent equivalent frames.

19. The system of claim 1, wherein the at least one supporting girder comprises at least one wide-shallow beam.

20. The system of claim 1, further comprising a display, wherein the computer is configured to provide the output to the display, and the display is configured to provide a visual representation of said data representing the determined longitudinal moment within the column beam portion and the determined longitudinal moment within the lateral section.

21. The system of claim 20, wherein the visual representation includes at least one of text, images, and graphics indicating the determined longitudinal moment within the column beam portion and the determined longitudinal moment within the lateral section.

22. A method for determining longitudinal moments in a one-way joist floor comprising a supporting girder, the method comprising:
representing a layout of the one-way joist floor as at least one equivalent frame;

determining, by at least one computer, a longitudinal moment within a column-beam portion of the at least one equivalent frame based at least in part on a vertical rigidity of the supporting girder, wherein the column-beam portion comprises at least one column; and determining, by at least one computer, a longitudinal moment within a lateral section of the at least one equivalent frame based on the longitudinal moment within the column-beam portion, and based at least in part on the vertical rigidity of the supporting girder, wherein the lateral section is located lateral to the column-beam portion; and providing an output that includes data representing the determined longitudinal moment within the column beam portion and the determined longitudinal moment within the lateral section.

23. The method of claim 22, wherein the output is provided to a display that is configured to provide a visual representation of said data representing the determined longitudinal moment within the column beam portion and the determined longitudinal moment within the lateral section.

24. The method of claim 23, wherein the visual representation includes at least one of text, images, and graphics indicating the determined longitudinal moment within the column beam portion and the determined longitudinal moment within the lateral section.

25. A non-transient, computer-readable medium encoded with a computer program, the computer program being configured to:

represent a layout of a one-way joist floor as at least one equivalent frame;

determine a longitudinal moment within a column-beam portion of the at least one equivalent frame based at least in part on a vertical rigidity of a supporting girder, wherein the column-beam portion comprises at least one column; and determine a longitudinal moment within a lateral section of the at least one equivalent frame based on the longitudinal moment within the column-beam portion, and based at least in part on the vertical rigidity of the supporting girder, wherein the lateral section is lateral to the column-beam portion; and provide an output that includes data representing the determined longitudinal moment within the column beam portion and the determined longitudinal moment within the lateral section.

26. The non-transient, computer-readable medium of claim 25, wherein the computer program being configured to provide the output to a display that is configured to provide a visual representation of said data representing the determined longitudinal moment within the column beam portion and the determined longitudinal moment within the lateral section.

27. The non-transient, computer-readable medium of claim 26, wherein the visual representation includes at least one of text, images, and graphics indicating the determined longitudinal moment within the column beam portion and the determined longitudinal moment within the lateral section.

* * * * *